United States Patent [19]

Lee et al.

[11] Patent Number: 5,041,220

[45] Date of Patent: Aug. 20, 1991

[54] HOLLOW FIBER FILTER CARTRIDGE FOR A STANDARIZED HOUSING

[75] Inventors: Jeffrey A. Lee, New Hope; William P. Burkinshaw, Minnetonka; Louis C. Cosentino, Plymouth; Daniel T. West, Crystal, all of Minn.

[73] Assignee: Minntech Corporation, Minneapolis, Minn.

[21] Appl. No.: 458,654

[22] Filed: Jan. 9, 1990

[51] Int. Cl.⁵ ............................................. B01D 63/02
[52] U.S. Cl. .......................... 210/321.8; 210/321.89; 210/500.23
[58] Field of Search ........... 210/321.8, 321.87, 321.88, 210/321.89, 500.23; 55/158

[56] References Cited

U.S. PATENT DOCUMENTS

| | | | |
|---|---|---|---|
| 3,698,560 | 10/1972 | Tapp et al. | 210/450 |
| 4,125,468 | 11/1978 | Joh et al. | 210/321.8 |
| 4,690,760 | 9/1987 | Smoot et al. | 210/321.5 |
| 4,876,006 | 10/1989 | Ohkubo et al. | 210/321.89 |

Primary Examiner—Robert A. Dawson
Assistant Examiner—Wanda L. Millard
Attorney, Agent, or Firm—Vidas & Arrett

[57] ABSTRACT

A filter cartridge using hollow fiber tubes is provided in a housing and configuration constructed and arranged to fit most commercial filter housing systems without modification. The hollow fiber cartridge provide a multiple improvement in filtering capacity and life before requiring replacement over prior units.

7 Claims, 5 Drawing Sheets

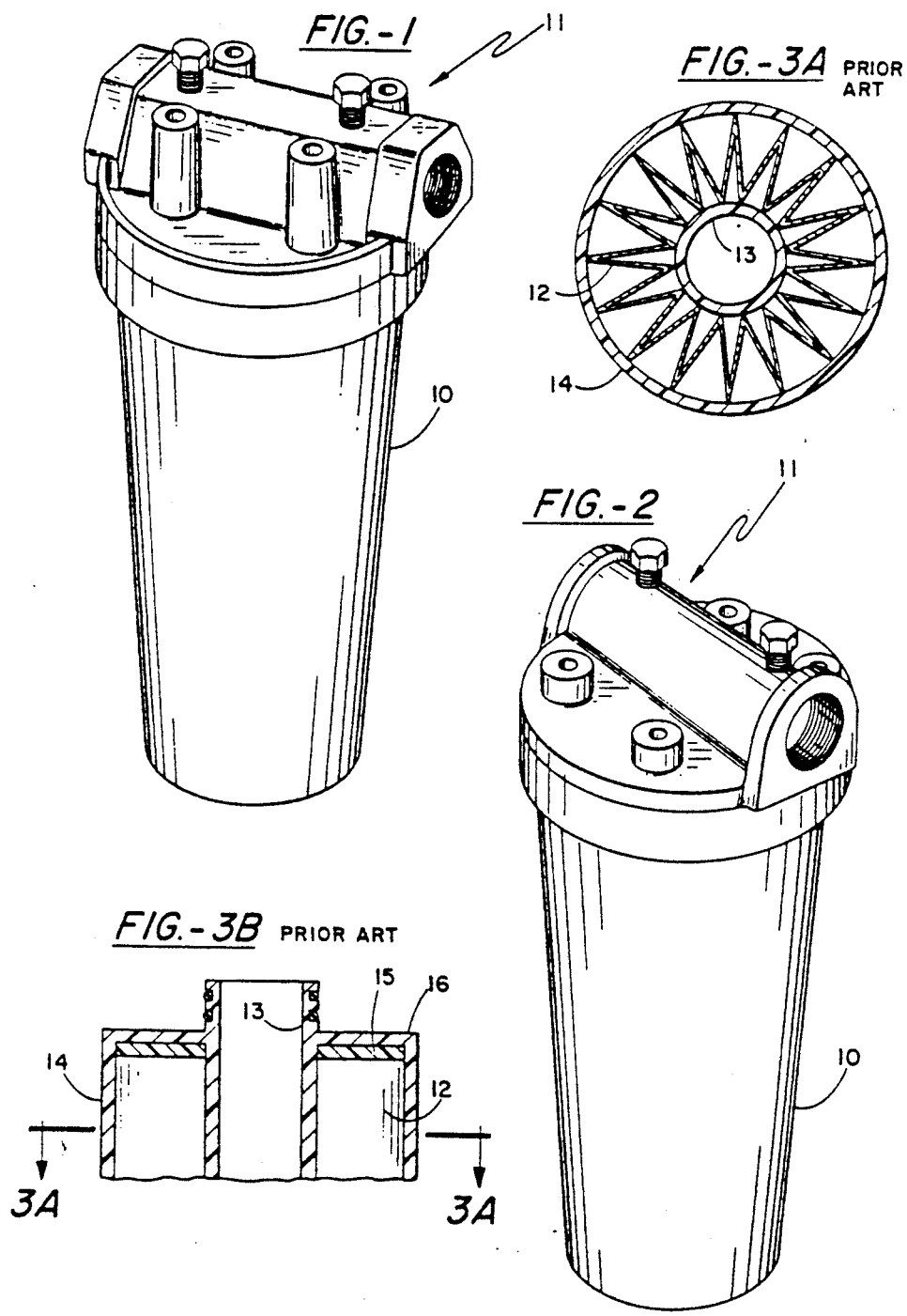

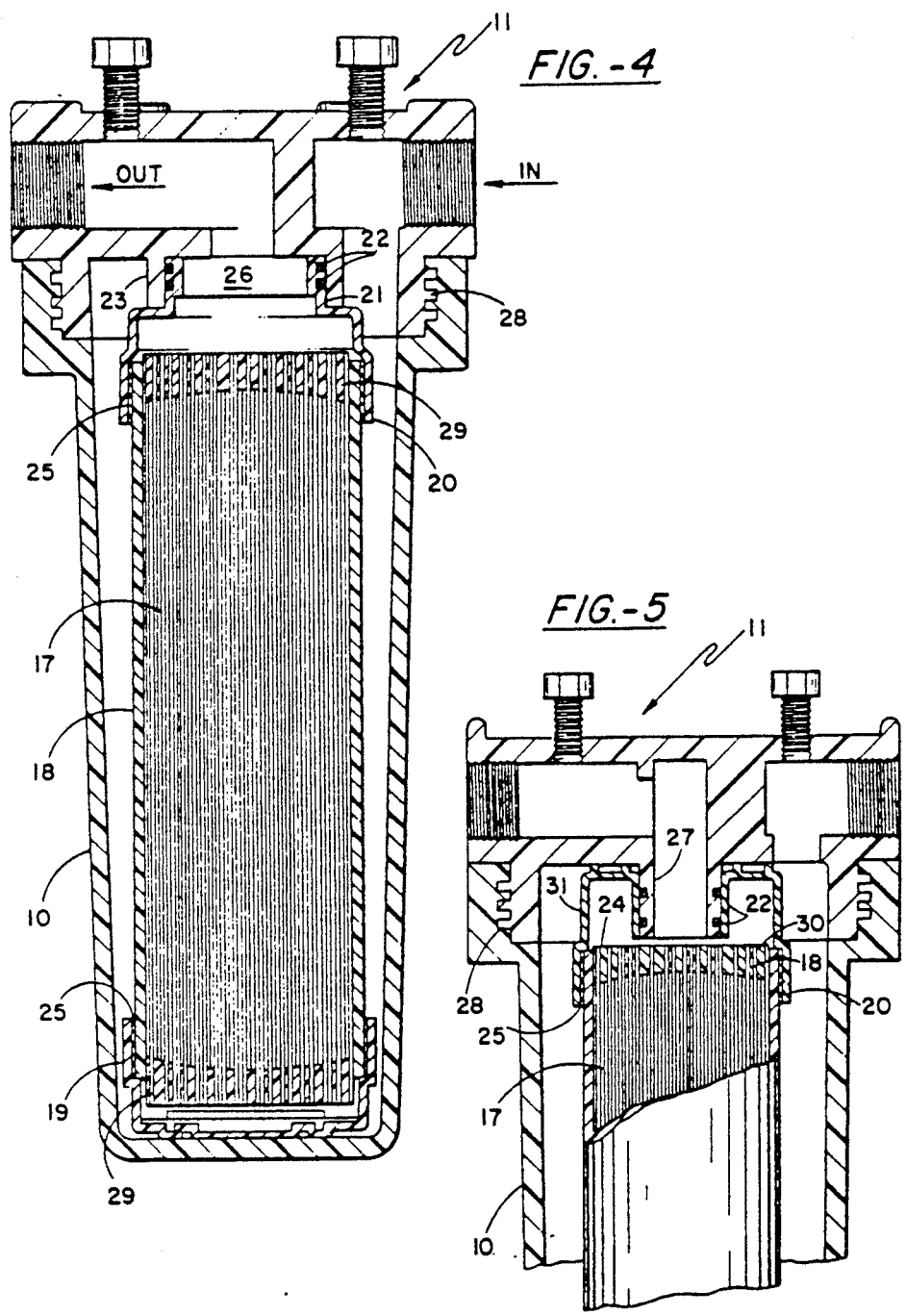

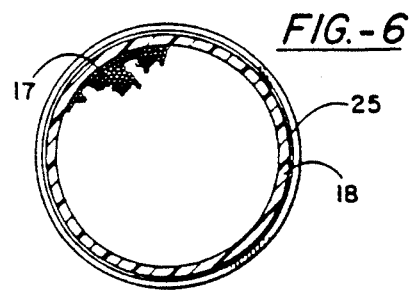
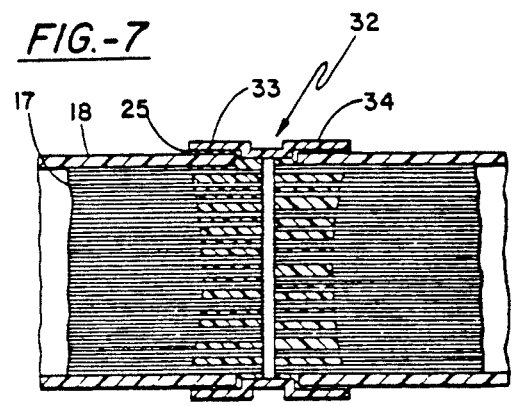
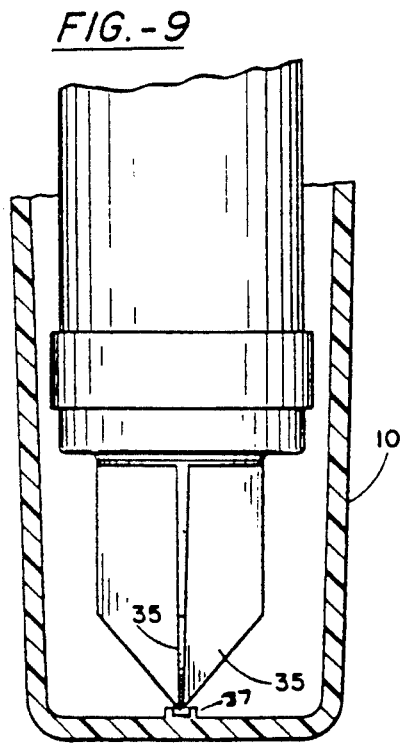
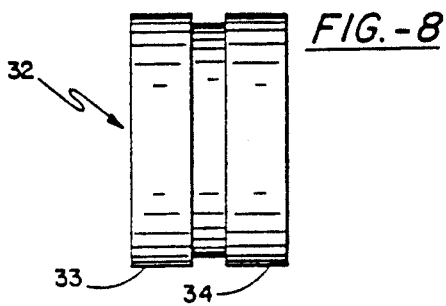
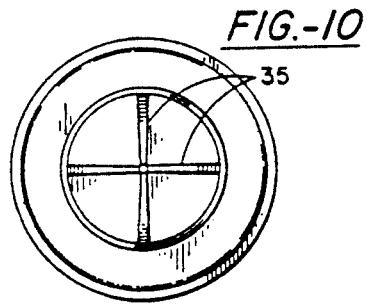

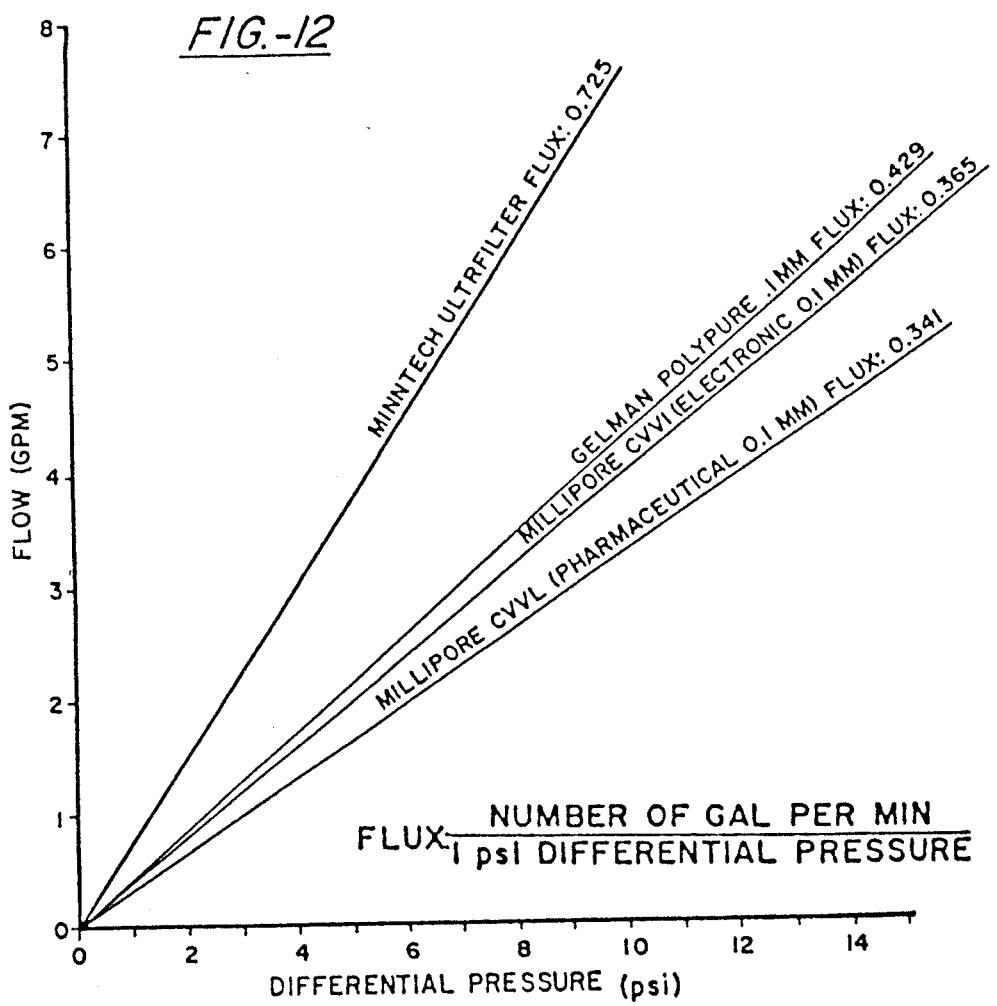

HOLLOW FIBER FILTER CARTRIDGE FOR A STANDARIZED HOUSING

FIELD OF THE INVENTION

The present invention is directed to hollow fiber filters and more specifically to replaceable filter cartridges of standardized dimension that are provided with substantially universal coupling adapters for inclusion in standard commercial filter housings. More specifically, the invention is to a construction wherein hollow fiber filter element cartridges are provided for the filtration of water, gases and other fluid materials. Multiple improvement over the presently used pleated filter units for commercial housings is achieved.

PRIOR ART

Prior art filter housings have been generally standardized in that they accept typically a cylindrical cartridge of about 3" diameter and from 8" to 12.6" and usually of 10" length. To date such cartridges have used a pleated membrane construction as the filtering element. Filter cartridges using pleated membranes have as a limit the capability of filtering particles equivalent to a molecular weight of (MW) 100,000 or larger. Such pleated membrane cartridges have a connector means for joining to the filter housing piping. The connection consists either of a pipe with external O-rings which is adapted to engage a female connector on the filter housing or a female construction adapted to cooperate with a male extension of the filter housing. The filtering capability of such prior art pleated membrane units has been used for a variety of purposes and in particular for the filtration of water for high purity application such as are used in the semi-conductor industry where very high standards of purity and where large flow volume is desired.

The pleated type of replaceable membrane filter element is in the general form of a tube with the outer portions of the folded pleated element defining the external diameter and the internal portions of the accordion pleat forming the internal diameter of the cylinder. Such an element is schematically shown in FIG. 3A and 3B. In such units, the upper and lower bounding surfaces of the pleated membrane must be potted into a liquid impermeable material so as to provide a seal between the internal region of the pleated member and the external region when joined to a filter housing. The outer plastic case housing the pleated membrane unit has openings therethrough so as to permit the water to be filtered to come into contact with the external surfaces of the pleated filter. The internal case portion of the unit that receives the filtered water is similarly a cylinder of a plastic material having openings therethrough. Once the liquid to be filtered has passed through the filter, it collected in this internal cylinder and is then available for distribution to whatever use location one desires.

Pleated membrane filter cartridge elements in accordance with this construction have received widespread usage for many years.

The drawbacks to such pleated units are readily apparent in contrast to the advantages of the present invention. First the total available filtering surface of such an element is severely restricted by contrast with that of the present invention. This can be readily appreciated from viewing FIGS. 3a and 3b. A large void region in the shape of a cylinder extends the length of the cartridge for receiving the filtered liquid of the cartridge. This void region does not contribute to filtering. Also, a large void region exists between the outer surface of the adjacent convolutions that does not contain filtering surfaces. This void area is not present in the present invention. Total available filtering surface is below what is desired for long life and high flow rates. Another serious disadvantage to pleated membrane constructions of the prior art is their tendency to collapse under high differential pressure loads, thus further limiting the filtering capacity of the unit for a given size filter chamber.

SUMMARY OF THE INVENTION

It is an object of the present invention to provide a replaceable cartridge filter of hollow fiber. The cartridge is constructed and arranged to be usable in standard filter units. The replaceable hollow fiber cartridge filter has a very high efficiency of particle removal, long life and high flow capacity by virtue of its very large surface area available for filtering compared to presently available cartridge filters. This high efficiency is provided in such a way as to utilize a much higher percentage of the total volume in the filter chamber for filtering purposes than has been heretofore available.

BRIEF DESCRIPTION OF THE DRAWINGS

FIG. 1 is a perspective view of a well-known filtering chamber;

FIG. 2 is a second variety of filtering chamber available in the market;

FIG. 3a is a cross-sectional view of a prior art pleated filter construction;

FIG. 3b is a partial sectional view of a pleated prior art filter installed in a filter chamber;

FIG. 4 is a filter chamber in cross-section having positioned therein a filter element in accordance with the invention;

FIG. 5 is a partial cross-sectional view of a filter element in accordance with the invention installed in a filter chamber;

FIG. 6 is a sectional view through a filter element in accordance with the invention;

FIG. 7 is a partial cross-sectional view of a joinder of two filter elements of the present invention to double the filter capacity;

FIG. 8 is an elevational view of a collar joining member;

FIG. 9 is a partially cross-sectional and elevational view of a cartridge in accordance with the present invention mounted in a filter chamber and including a support means for the cartridge;

FIG. 10 is a bottom elevational view of the cartridge of FIG. 9;

FIG. 12 is a graph comparing performance characteristics of a filter in accordance with the invention with the same size elements using pleated members used heretofore.

DETAILED DESCRIPTION OF THE PREFERRED EMBODIMENTS

Figure 11:
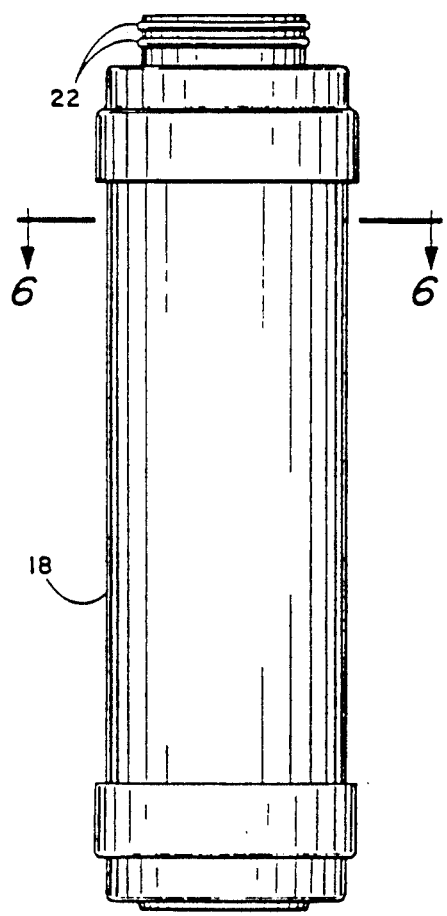
FIG. 11 is a elevational view of a cartridge in accordance with the present invention which has a male coupling member.

The present invention is one that meets the multiple requirements of having a readily replaceable hollow fiber filter cartridge possessing the capability of removal of particulate and other substances down to molecules of as low as 1000 MW, high flow volume capacity, an ability to be utilized for an extended periods of time without clogging and one which is capable of being backflushed to even further increase its overall life. It is further, by virtue of its construction, adapted to fit most industry standard filtering chambers without any modification while still achieving a liquid tight seal between the fluid to be filtered and the filtered fluid. High differential pressures are possible because of the use of hollow fibers as the filtering medium.

These multiple advantages defined above are met through the provisions of having a large number of permeable hollow fibers arranged in a parallel array. The individual hollow fibers should comprise sufficient hollow fibers so that the effective filtering surface at the O.D. of the fibers exceeds 15 square feet within the confines of space available for a filter cartridge fitting, the standard filter chambers of industry. For efficiency, the packing density of the fibers is from 40% to 75%. It has been found that if the packing density of the fibers is greater than 75%, it is difficult to assure that a liquid tight seal is in existence between each fiber to isolate the external pre-filtered material from the internal regions where flow takes place of the filtered material. Below about 40% packing density, the hollow fibers have excessive amounts of space therebetween lessening the overall filtering capacity. Packing density is defined as that percentage of the total cross-sectional area in the encapsulating region occupied by the combined cross-sectional area of the hollow-fibers.

Very large numbers of hollow fibers are desirable. The number possible is dependent upon the O.D. of the individual fibers and upon the cross-sectional space available. The number is also dependent on the packing density as defined above. In order to insure desired volume flow of greater than 0.1 gallons per minute of water through a filter which retains particles larger than molecules of a molecular weight of 1000 at a pressure differential of about one psi and at room temperature it is desirable to have the available filtering surface equal to or greater than 15 square feet. In actual units surface area of the hollow fibers available for filtering have been as large as 89 square feet for a standard size cartridge.

Filter cartridges in accordance with the invention can be used for filtering of gases or liquids. One major anticipated use will be in connection with filtering of water. For that reason the invention will be described primarily in connection with that purpose. However, it should be understood that filter cartridges in accordance with the invention can be used for virtually all fluids whether liquid or gaseous. A variety of material can be used for the hollow fibers. These include polysulfones, polyvinylidine fluoride, cellulose esters, polyethylene, polypropylene and the like. The choice of which type will depend on the materials to be filtered, cost and the like.

It has been found that in order to adapt a unit to fit most of the commercially operating filter chambers, that the hollow fibers should have an overall length from end to end of from 8.5 to 11.5 inches. By maintaining overall length within these dimensions, a filter cartridge can be economically manufactured to adapt to a large number of manufacturers, filter chambers. The external diameter of a cartridge filter in accordance with the invention should be less than 3.3 inches. For uniformity of manufacture, the maximum O.D. of the cartridge is desirably maintained below 3.0 inches.

Prior investigators have proposed the use of hollow fibers for filters. For example, Okano et al, U.S. Pat. No. 4,547,289 proposes a hollow fiber filter element. In the Okano et al, the invention is directed to a means for visually determining whether leakage has occurred between a pair of coupling O-rings permitting unfiltered water to bypass the seal means.

The preferred hollow fibers in the present invention are manufactured from polysulfones, although other hollow fiber materials having porosity of the desired level can be used. Further, the present invention utilizes sufficient number of hollow fibers so that the outer surface area for filtering is greater than 15 square feet within an overall replaceable cartridge whose nominal dimensions are 2.7" diameter and 10 length. Flow rates and life before clogging are greatly superior to pleated membrane units within the same dimensions. The advantages of the present invention provide a much more efficient construction, wherein a maximum exposure of hollow fiber surface to the liquid to be filtered is attained with a minimum wastage of hollow fiber surface area. Also, the very large surface area of hollow fibers gives a multiplying of the rate of filtration possible heretofore for standard filter replaceable cartridges of the pleated membrane type. These differences will be more readily apparent after a study of the following description.

FIGS. 1 and 2 show the close similarity of two of the overall filter chambers now in use in industry. The chambers consist of an external closed end cylinder 10 having a screw in cap member 11 which is threadedly received into member 10. Suitable O-rings (not shown) are utilized to provide a positive fluid tight seal of cover 11 to base 10. In FIG. 2, a somewhat similar unit is shown which has the same function of the parts identified 10' and 11'.

A third type of filter chamber is conceptually quite similar to FIG. 4 insofar as the connecting means 23 is concerned excepting that a bayonet style locking arrangement is provided for both the filter chamber element 23 and the connector means 21.

In FIGS. 4, 5, and 9, the outer container is designated with the same numbers as with FIGS. 1 and 2.

Turning to FIGS. 3a and 3b, there is shown a cross-sectional view in FIG. 3a of a membrane filter cartridge in accordance with the prior art using pleated membrane 12. This pleated membrane is positioned within the annulus defined by rings 13 and 14 which, as can be seen in FIG. 3b, consist of concentric cylinders joined at the top (by member 16) and also joined at the bottom as well to pleated member 12. Cylinders 13 and 14 are both provided with a plurality of openings therethrough so as to allow the water to be filtered to pass onto the surface of and thence through pleated membrane 12 and to be collected in the interior of ring 13. The opposing ends of pleated membrane 12 are potted into a sealing compound 15 at each end thereof so as to allow passage of fluid only through the convolutions of the pleat. Simultaneously there is provided a seal to the chamber walls 14 and top and bottom 16. For a typical 10" long pleated filter cartridge element having a cross-sectional area of about 5.0 square inches, the effective filter area is approximately 5 square feet. This contrasts with filter elements in accordance with the present invention where for the same 10" long element of the same cross-sectional area, the cartridge will have a filter area in excess of 15 square feet and up to about 90 square feet. This great increase in filter area provides rapid flow of filtrate and a longer period of time of operation before clogging. The hollow fiber cartridge also permits much higher differential fluid pressures across the filtering element without the fear of collapse of the walls.

The advantage of a filter element in accordance with the invention is shown in part in FIG. 12 showing flow rates at differential pressures for the invention and for three prior filters of the pleated membrane type in the same size cartridge. As can be seen, the effective flow is several times larger for the cartridges of the invention. The flow of filter cartridges in accordance with the present invention is greater than 0.1 gal/minute at one psi differential pressure at room temperature for water.

Turning now to FIG. 4, there is illustrated a filter element in accordance with the present invention mounted in a filter chamber of the types shown in FIGS. 1 and 2. Cap 11 is provided with mating threads to form a threaded junction 28 for closure of the filter chamber. Port means are provided for ingress and egress of water into and out of the system. A female projection 23 extends downwardly from cap member 11 and is designed to mate with a male section of a replaceable filter element. The filter element will typically employ two O-rings 22 to bear against the internal shoulder of member 23 to provide a liquid tight seal therebetween.

The most commonly used filter chambers have two different sizes for the inner diameter of member 23. The first has a 1.0 inch O.D. and the second a 2.25 inch I.D. Coupling cap 21 in the case of the 1.0 inch O.D. filtering will have an I.D. of from 0.975 to 1.04 inches. Two grooves holding O-rings 22 are provided. The grooves for the O-rings can be made to accommodate different size O-rings including those designated —020 and —211. As used herein, and in the chart below, when a designation is made such as —020 Style it is meant as a coupling assembly of a 1.0 inch diameter. Similarly, a —222 Style is to be understood to be a coupling of 1.75 inch diameter. A —226 Style is to be understood to mean a 2.250 inch diameter coupling. It is not meant to restrict the O-ring sizes to those numerical designations.

The filter element in accordance with the invention comprises a large number of hollow fiber members 17. These hollow fibers are positioned within a outer supportive porous sleeve member 18 and are then shallowly potted at the extreme remote ends thereof in a thermosetting potting compound 29 such as polyurethane or epoxy to seal the individual fibers to one another and to the extreme ends of cylinder 18. Cylinder 18 is highly porous to allow ready flow of fluids therethrough. It is stiff enough to support the end caps in spaced relationship and act as a protective shield to the fibers from mechanical damage. The depth of the potting 29 is desirably maintained very shallow commensurate with the necessity of insuring a liquid tight seal between the individual fibers and to the wall of cylinder 18. At the open fiber end 24 (See FIG. 5), the depth of the potting will be about 0.25 inches. Greater depth can be used. However, so long as a seal is obtained no useful purpose is served and greater depth lessens the available filtering surface. The individual fibers can be in a U-shape so that a single fiber extends down and back to create two fibers in cross-section.

After this potting procedure, the upper end 24 of the hollow fibers and the potting procedure is cut to present the open interiors of the individual hollow fibers 17. The lower end of internal portions of the encapsulated ends of the fibers may be opened or they may be left potted depending upon the ultimate use of the individual filter cartridge. The upper end 24 of the now open potted fibers is sealingly joined to a member 20 that forms a cap for the hollow fiber and sleeve 18 assembly.

| CARTRIDGE FILTER SPECIFICATION Packing Density = 60%   Fiber OD = 0.014173   Fiber ID = .01102 | | | | | |
|---|---|---|---|---|---|
| HOUSING NAME | HOUSING INSIDE DIAMETER | OVERALL LENGTH | CLEARANCE DIAMETER | FILTER OUTSIDE DIAMETER | EFFECTIVE LENGTH |
| —222 STYLES (O-rings on Filter) - 1.75" Dia. Mouth | | | | | |
| Filterite Flouroplus | 3.090 | 12.500 | .092 | 2.998 | 10.875 |
| Filterite VP-10-3/4 | 3.100 | 12.500 | .092 | 3.008 | 10.875 |
| Millipore (with spud) | 3.190 | 12.625 | .090 | 3.100 | 11.000 |
|  | 3.230 | 10.575 | .090 | 3.140 | 8.95 |
| Ametek #12 | 3.360 | 12.375 | .085 | 3.275 | 10.75 |
| Ametek #10 | 3.400 | 9.750 | .083 | 3.317 | 8.125 |
| PALL | 2.920 | 11.000 | .098 | 2.822 | 9.375 |
| COMPOSIT (—222) | 2.920 | 9.750 | .098 | 2.822 | 8.125 |
| —020 STYLE (O-rings on housing) - 1.04" Dia. Mouth | | | | | |
| Gelman Bl.Bowl | 3.425 | 9.875 | .083 | 3.342 | 8.188 |
| Gelman C.Bowl | 3.410 | 10.062 | .083 | 3.327 | 8.313 |
| Filterite LMO-PP (Composit All) | 2.875 | 10.000 | .099 | 2.776 | 8.062 |
| —226 Industrial Style O-rings on filter - 2.250" Dia. Mouth | | | | | |
| Filterite | 2.920 | 12.50 | .420 | 2.50 | 8.375 |
| Pall | 2.920 | 12.50 | .170 | 2.75 | 8.625 |
| Composit (—226) | 2.920 | 12.50 | .420 | 2.50 | 8.375 |
|  | FILTER | FILTER |  | FILTER | FILTER |

-continued

CARTRIDGE FILTER SPECIFICATION
Packing Density = 60% Fiber OD = 0.014173 Fiber ID = .01102

| HOUSING NAME | NET INSIDE DIA | NET AREA | NUMBER OF FIBERS | AREA ID FT$^2$ | AREA OD FT$^2$ |
|---|---|---|---|---|---|
| \-222 STYLES (O-rings on Filter) - 1.75" Dia. Mouth | | | | | |
| Filterite Flouroplus | 2.718 | 5.802 | 22,066 | 57.7 | 74.20 |
| Filterite VP-10-3/4 | 2.728 | 5.845 | 22,229 | 58.1 | 74.8 |
| Millipore | 2.820 | 6.245 | 23,753 | 62.8 | 80.80 |
| (with spud) | 2.860 | 6.424 | 24,432 | 52.6 | 67.6 |
| Ametek #12 | 2.995 | 7.045 | 26,793 | 69.2 | 89.1 |
| Ametek #10 | 3.036 | 7.239 | 27,531 | 53.8 | 69.2 |
| PALL | 2.542 | 5.075 | 19,300 | 43.5 | 55.9 |
| COMPOSIT (−222) | 2.542 | 5.075 | 19,300 | 37.7 | 48.5 |
| \-020 STYLE (O-rings on housing) - 1.04" Dia. Mouth | | | | | |
| Gelman Bl.Bowl | 3.062 | 7.363 | 28,005 | 55.1 | 70.9 |
| Gelman C.Bowl | 3.047 | 7.292 | 27,732 | 55.4 | 71.3 |
| Filterite LMO-PP (Composit All) | 2.496 | 4,893 | 18,608 | 36.1 | 46.4 |
| \-226 Industrial Style O-rings on filter - 2.250" Dia. Mouth | | | | | |
| Filterite | 2.220 | 3.870 | 14,720 | 29.6 | 38.1 |
| Pall | 2.470 | 4.791 | 18,223 | 37.8 | 48.6 |
| Composit (−226) | 2.22 | 3.870 | 14,720 | 29.6 | 38.1 |

A bonding adhesive that sealingly isolates the interior of the fibers from the exterior of the fibers is provided between 18 and 20 and is designated 25. A suitable encapsulant and adhesive is polyurethane.

Cap 20 is provided with a projecting male member 21 which has recesses around the periphery thereof to contain O-rings 22.

To maximize the available amount of hollow fiber for filtering and minimize the waste space, a very shallow (generally less than ¼" of space) is provided above the surface 24 before reaching the male exit region 26. The portion defined by the male exit 21 is desirably kept at as shallow a depth as possible commensurate with providing a positive seal between member 23 and member 21 by means of the O-rings 22.

At the base of hollow fibers 17 and sleeve 18, there is provided a second cap 19 which is closely sealed by means of bonding material 25 at the lower end of the assembly. The hollow fibers 17 will likewise be sealed by the potting compound which is not cut so as to open the interior of the fibers as was described with respect to the upper end. In an alternate construction, the fibers will be cut open at both ends for cascading of cartridges as shown in FIGS. 7 and 8. This will be described below.

Turning now to FIG. 5 there is shown an alternative form of the hollow fiber filter cartridge element. In this drawing, like parts will be given the same designation with respect to the earlier discussion. As can be seen in the drawings in this instance, cap member 11' also is provided with threads that screw into cylinder 10'. The cap member 11' has a downwardly projecting member 27 which in this instance is provided with recesses for holding an O-ring 22'. This contrasts with the earlier description of member 23 which did not have provisions for an O-ring.

The construction of a hollow-fiber cartridge is substantially the same as that described with respect to the cartridge shown in FIG. 4. That is, a plurality of fibers of the same range of pack density as described above is enclosed within a porous cylinder 18. In this instance of FIG. 5, however, the upper cap member 30 is shaped so as to have a downwardly projecting receiving chamber for member 27. That downwardly projecting tube is designated 31. Member 31 projects downwardly from the uppermost regions of the cap 30 to a position from ⅛" to ¼" above the surface of the open end of fibers designated 24. This provides an ample space for flow of filtrate from the internal portions of fibers 17 to the receiving region within member 27. The opposite ends of hollow fibers 17 may be either sealed as is described with respect to FIG. 4, or as will be described, left open to permit cascading of two or more fiber elements.

In each of the constructions discussed above hollow fibers 17 are desirably ones having an internal diameter of about 0.011 and an external diameter of 0.014 to provide a very thin wall. That thin wall is manufactured to contain small openings therethrough. For the most thorough filtering, the openings will be of a size which will not pass materials of a size greater than 1000 MW. The overall length of the units will vary depending upon the ultimate filter chamber into which they are to be placed, but will advantageously be an overall length of 8" to 12.6".

Large diameter hollow fibers may be used. However, the total filtering surface possible is less for a given size cartridge outer dimensions the larger the diameter of the hollow fibers. Smaller diameter hollow fibers are preferred. As stated previously, the hollow fiber cartridge should have at least 15 square feet of filtering surface to insure flow rates of greater than 0.1 gallons per minute at one psi differential when the filter screens out material greater than that with a size of a molecule of 1000 MW.

FIG. 6 shows a cross sectional view partially filled in for the individual fibers of constructions described with respect to either FIGS. 4 or 5. As can be seen, there is no central void area, as is true in the pleated filters of the prior art. Rather all space is substantially used for receiving incoming liquid to be filtered, or for delivery of filtered liquid to the ultimate user.

Shown in the chart below is a description of hollow fiber filter cartridges manufactured in accordance with the teachings of the present invention and specifically identified with respect to the ideal sizes and resulting construction for a variety of filter housing. As previously described above the designations −020 Style, −222 Style, and −226 Style are to be understood to mean connectors of 1", 1.75" and 2.25" diameters respectively and not as limited to those size O-rings.

There are two basic types of housings—one which utilizes O-rings on the filter element itself and the others where the O-ring sealing means is on the pipe of the filter chamber. Also, as is illustrated in the chart, the filter area in square feet runs from 38 sq. feet to a high of 89 sq. feet per fiber filter cartridge. Many of the advantages of the invention are obtained even when the filter area is as low as 15 square feet.

Turning now to FIGS. 7 and 8, there will be seen a joining sleeve 32. This joining sleeve has two widened receiving areas 33 and 34 which are of a size to receive an outer portion of the encapsulated ends of the hollow fibers. The joining sleeve 32 is passed over an upper and a lower end respectively of the encapsulated and sleeved portions of two filter cartridges. The lower portion of the hollow fibers 17 have been sliced through the potting to be also opened as is the top region 24. The sleeve 32 is bonded to the encapsulated ends and sleeve to make a liquid tight seal. Thus there is a cascading of the two elements making a single filter element 20" or more in length for adapting to certain specific filter housings without the necessity of designing and constructing separate cartridge elements to meet this need.

It is occasionally desirable to have the base of the filter cartridge in accordance with the invention bear against a surface at the bottom of chamber 10 or 10'. This is to prevent any internal back pressure in the filter cartridge from disengaging the seal O-rings and thereby result in leakage by reason of movement of the cartridge away from the junction. Also, by use of a restraining annulus 37 in FIG. 9, any tendency for movement in a transverse mode is avoided. As seen in FIGS. 9 and 10, this can be accomplished by having a bonded-on tip 35 to the base cap member 19. This member 35 can be selectively joined to a "standard" filter cartridge to adapt it to varying lengths of cylinders 10. The obvious advantages to doing so is to provide a substantially universal cartridge.

While the invention has been described with respect to a specific hollow fiber, it is possible to substantially vary the diameters, both internal and external of the fiber, and to achieve many, if not all, of the advantages of the present invention. That is, rather than being limited to the specific examples given here wherein the fibers have a O.D. of about 0.0014" and an O.D. of about 0.0010", variations from these specific dimensions can be utilized. The general advantage is to use fibers of as small a diameter as possible to maximize the total surface area available. In all events a filter cartridge in accordance with the invention has a filter surface area in excess of 15 square feet.

What is claimed is:

1. A replaceable hollow fiber cartridge filter for use in standardized filter housing capable of receiving a filter cartridge of about 2.5 inch O.D. and about 10" to 12.6" overall length comprising:
   a) a bundle of fluid permeable hollow fibers of effective length of approximately 8 to 11 inches of effective filtering surface;
   b) a supportive porous sleeve member surrounding said bundle of hollow fibers substantially throughout their length for supporting and confining said fibers;
   c) cap members joined to said sleeve member at opposite ends thereof; at least one of said cap members being provided with coupling means for one of a −020 Style, −222 Style, or an −226 Style fitting;
   d) encapsulating means sealing at least the end of said fibers at the coupling means end to one another and to the sleeve member in a gas and liquid-tight assembly including sealing between the coupling means and the sleeve member; while leaving at least the interior of the ends of said hollow fibers adjacent said coupling means open;
   e) said bundle of hollow fibers having a filter surface area greater than about 15 square feet.

2. A replaceable hollow fiber cartridge in accordance with claim 1 wherein the outer diameter of the cross-section of said hollow fibers is about 2.5 inches and the effective filtering length of said fibers is about 8 inches.

3. A replaceable hollow fiber cartridge in accordance with claim 2 wherein the outside filter surface area of a said hollow fibers is in excess of about 48 square feet.

4. A replaceable hollow fiber cartridge in accordance with claim 1 wherein each end of said bundle of hollow fibers is encapsulated.

5. A replaceable hollow fiber cartridge filter in accordance with claim 1 wherein the hollow fibers have an O.D. of about 0.014 inches.

6. A replaceable hollow fiber cartridge filter in accordance with claim 1 wherein the O.D. of said cartridge is less than 3.3 inches and the length is less than about 11.4 inches and wherein the effective filter surface area is from about 38 to 89 square feet.

7. A replaceable hollow fiber cartridge filter for use in standardized filter housing capable of receiving a filter cartridge of about 2.5 inch O.D. and about 10" to 12.6" overall length comprising:
   a) a bundle of fluid permeable hollow fibers of effective length of approximately 8 to 11 inches of effective filtering surface wherein the packing density of said fibers is from about 40 to 75%;
   b) a supportive porous sleeve member surrounding said bundle of hollow fibers substantially throughout their length for supporting ad confining said fibers;
   c) cap members joined to said sleeve member at opposite ends thereof; at least one of said cap members being provided with coupling means for one of a −020 Style, −222 Style, or an −226 Style fitting;
   d) encapsulating means sealing at least the end of said fibers at the coupling means end to one another and to the sleeve member in a gas and liquid-tight assembly; while leaving at least the interior of the ends of said hollow fibers adjacent said coupling means open;
   e) said bundle of hollow fibers having a filter surface area greater than about 15 square feet.

* * * * *

UNITED STATES PATENT AND TRADEMARK OFFICE
CERTIFICATE OF CORRECTION

PATENT NO. : 5,041,220

DATED : August 20, 1991

INVENTOR(S) : Lee et al

It is certified that error appears in the above-identified patent and that said Letters Patent is hereby corrected as shown below:

Col.6, line 29 , deleting the word "procedure" and inserting "29" after "potting".

Col.10, line 53, delete "ad" and insert therefor -- and --.

Signed and Sealed this

Twenty-sixth Day of January, 1993

Attest:

STEPHEN G. KUNIN

*Attesting Officer*     Acting Commissioner of Patents and Trademarks